(12) United States Patent
Kopp et al.

(10) Patent No.: US 9,650,060 B2
(45) Date of Patent: May 16, 2017

(54) SWIVELABLE AND UNIDIRECTIONAL PLATFORM TRUCK

(71) Applicant: Suncast Technologies, LLC, Palm Beach Gardens, FL (US)

(72) Inventors: Robert G. Kopp, Elburn, IL (US); Michael G. Thuma, La Grange, IL (US); Michael R. Vogler, Oswego, IL (US)

(73) Assignee: Suncast Technologies, LLC, Palm Beach Gardens, FL (US)

( * ) Notice: Subject to any disclaimer, the term of this patent is extended or adjusted under 35 U.S.C. 154(b) by 0 days.

(21) Appl. No.: 14/854,797

(22) Filed: Sep. 15, 2015

(65) Prior Publication Data

US 2017/0072978 A1    Mar. 16, 2017

(51) Int. Cl.
| | | |
|---|---|---|
| B60B 33/02 | (2006.01) |
| B62B 3/00 | (2006.01) |
| B62B 5/04 | (2006.01) |
| B62B 3/02 | (2006.01) |
| B62B 5/06 | (2006.01) |

(52) U.S. Cl.
CPC ............... B62B 3/00 (2013.01); B62B 3/02 (2013.01); B62B 5/04 (2013.01); B62B 5/067 (2013.01); *B62B 2301/0463* (2013.01); *B62B 2301/0467* (2013.01); *B62B 2501/06* (2013.01)

(58) Field of Classification Search
CPC ............ B60B 33/02; B62B 2301/0463; B62B 2301/04632
See application file for complete search history.

(56) References Cited

U.S. PATENT DOCUMENTS

| | | |
|---|---|---|
| 1,304,711 A | 5/1919 | Skibbe et al. |
| 2,046,105 A | 6/1936 | Bowen |
| 2,058,205 A | 10/1936 | Bandura |
| 2,114,586 A | 4/1938 | Bowen |
| 2,154,525 A | 4/1939 | Noros et al. |
| 2,251,567 A | 8/1941 | Gould et al. |
| 2,422,892 A | 6/1947 | Forbes et al. |
| 2,684,734 A | 7/1954 | Wilson |
| 2,949,317 A | 8/1960 | Zaha |
| 3,061,049 A | 10/1962 | Bramley |
| 3,159,865 A | 12/1964 | Shepherd |
| 3,206,223 A | 9/1965 | Frye |
| 3,563,563 A | 2/1971 | Radovic |

(Continued)

*Primary Examiner* — Bryan Evans
(74) *Attorney, Agent, or Firm* — McHale & Slavin, P.A.

(57) ABSTRACT

In general, the present invention provides a platform truck. More specifically, the present invention provides a platform truck comprised of a base member, a handle, a pair of swivel caster wheels depending from the bottom surface back end of the base member, a pair of swivel-lock caster wheels depending from the bottom surface front end of the base member, and a user-activated actuator assembly carried on the bottom surface of the base allowing the front swivel-lock casters to be switched between a unidirectional position and swivelable position to more easily negotiate tight turns and doorways is disclosed. Also included is a handle that is stowable within the base portion of the platform truck so that the platform truck may include one or two handles, whereby a handle may be included on one or both ends of the platform truck.

8 Claims, 8 Drawing Sheets

(56) References Cited

U.S. PATENT DOCUMENTS

| | | | | |
|---|---|---|---|---|
| 3,762,739 | A * | 10/1973 | Tabet | B62B 3/02 280/47.371 |
| 3,974,542 | A | 8/1976 | Timmer et al. | |
| 3,985,208 | A | 10/1976 | Libbart | |
| 4,203,609 | A | 5/1980 | Mitchell et al. | |
| 4,205,413 | A | 6/1980 | Collignon et al. | |
| 4,248,444 | A | 2/1981 | Johnson | |
| 4,336,629 | A | 6/1982 | Jarvis, Jr. et al. | |
| 4,349,937 | A * | 9/1982 | Fontana | B60B 33/0078 16/35 R |
| 4,349,938 | A | 9/1982 | Fontana | |
| 4,570,288 | A | 2/1986 | Kassai | |
| 4,669,580 | A | 6/1987 | Neville | |
| 4,722,114 | A | 2/1988 | Neumann | |
| 4,793,445 | A | 12/1988 | Collignon et al. | |
| 4,875,696 | A | 10/1989 | Welch et al. | |
| 4,922,574 | A | 5/1990 | Heilgenthal et al. | |
| 4,998,320 | A | 3/1991 | Lange | |
| 5,170,529 | A * | 12/1992 | Kovacs | B60B 33/025 16/35 R |
| 5,199,534 | A | 4/1993 | Goff | |
| 5,377,372 | A | 1/1995 | Rudolf et al. | |
| 5,497,856 | A | 3/1996 | Block et al. | |
| 5,517,718 | A | 5/1996 | Eichhorn | |
| 5,774,936 | A | 7/1998 | Vetter | |
| 5,799,366 | A | 9/1998 | Zocco et al. | |
| 5,829,096 | A | 11/1998 | Perry | |
| D404,871 | S | 1/1999 | Golichowski et al. | |
| 5,983,614 | A | 11/1999 | Hancock et al. | |
| 6,024,376 | A | 2/2000 | Golichowski et al. | |
| 6,161,849 | A | 12/2000 | Schweninger | |
| 6,584,641 | B1 | 7/2003 | Milbredt | |
| 6,626,449 | B2 | 9/2003 | Hazen | |
| 6,662,404 | B1 | 12/2003 | Stroh et al. | |
| 6,880,202 | B2 | 4/2005 | Thompson et al. | |
| 6,931,692 | B2 | 8/2005 | Guttmann et al. | |
| 7,017,228 | B2 | 3/2006 | Silverstein et al. | |
| 7,083,174 | B2 | 8/2006 | Kane | |
| 7,201,385 | B2 * | 4/2007 | Renz | B62B 3/02 280/47.34 |
| 7,225,903 | B2 | 6/2007 | Nebolon et al. | |
| 7,520,021 | B2 | 4/2009 | Chou | |
| 7,698,760 | B2 | 4/2010 | Reckelhoff et al. | |
| D618,421 | S | 6/2010 | Catron et al. | |
| D618,422 | S | 6/2010 | Catron et al. | |
| 7,810,613 | B2 | 10/2010 | Lin | |
| 7,861,370 | B2 | 1/2011 | Chu | |
| 7,926,145 | B2 | 4/2011 | Liao | |
| 7,930,802 | B2 | 4/2011 | Tsai | |
| 7,950,108 | B2 | 5/2011 | Yang et al. | |
| 7,992,254 | B2 | 8/2011 | Ahn et al. | |
| 8,282,112 | B2 | 10/2012 | Rich | |
| 8,365,354 | B1 | 2/2013 | Fan | |
| 8,418,315 | B2 | 4/2013 | Lin et al. | |
| 8,418,786 | B2 | 4/2013 | Clapp et al. | |
| 8,424,158 | B2 | 4/2013 | Steenson | |
| 8,490,242 | B2 | 7/2013 | Cooper et al. | |
| 8,499,413 | B1 | 8/2013 | Tsai | |
| 8,516,656 | B2 | 8/2013 | Lin et al. | |
| 8,523,214 | B2 | 9/2013 | Johansson et al. | |
| 8,567,010 | B2 | 10/2013 | Trivini | |
| 8,567,798 | B2 | 10/2013 | Rossini et al. | |
| 8,640,832 | B2 | 2/2014 | Chen et al. | |
| 8,684,145 | B2 | 4/2014 | Boukhny et al. | |
| 8,695,996 | B2 | 4/2014 | Janick et al. | |
| 8,714,314 | B1 | 5/2014 | Chen | |
| 8,726,462 | B2 | 5/2014 | Dayt | |
| 8,789,662 | B2 | 7/2014 | Childs et al. | |
| 8,806,714 | B2 | 8/2014 | Eguchi | |
| 8,850,657 | B1 | 10/2014 | Yang | |
| 8,910,953 | B2 | 12/2014 | Faulhaber | |
| 2004/0194221 | A1 | 10/2004 | Thompson et al. | |
| 2007/0089265 | A1 | 4/2007 | Lin | |
| 2010/0132159 | A1 | 6/2010 | Armano et al. | |
| 2013/0174377 | A1 | 7/2013 | Lin et al. | |

* cited by examiner

SWIVELABLE AND UNIDIRECTIONAL PLATFORM TRUCK

FIELD OF THE INVENTION

The present invention relates generally to platform hand trucks, and more particularly, a platform hand truck having an actuator allowing the front casters to be switched between a fixed position and a swivel position to more easily negotiate tight turns and doorways.

BACKGROUND OF THE INVENTION

Platform trucks are well known in industry for moving loads that cannot be easily transported by hand. A typical platform truck includes a generally rectangular, flat, material-supporting surface having two swivel casters positioned at the handle or rear end of the truck and two unidirectional, non-swiveling, wheels at the front end of the platform truck. This configuration is advantageous for carrying heavy loads because it prevents the front casters from following the terrain while allowing the operator to control the path of the swiveling casters with the handle. However, this configuration is difficult to maneuver in tight areas where loads are often transported due to the requirement that the rear of the platform truck be pivoted around the front wheels, placing the center of the turning radius in between the front unidirectional wheels. Thus, in these situations it is advantageous for the front casters to swivel along with the rear casters.

Thus, it has been suggested in the prior art to construct the platform truck so that the handle can be moved from one end of the platform truck to the other. In these platform trucks, a post receptacle is provided at each corner of the platform for receiving the ends of an inverted U-shaped handle. In this manner, when a user needs a rear steer platform truck, the handle can be placed at the rear of the platform truck near the swiveling casters; and if the user needs a front steer platform truck, the handle can be placed at the front of the platform truck near the unidirectional wheels. However, these constructions have proven to be cumbersome and unreliable as the handles commonly get bent or sprung and are difficult, if not impossible, to move from one end of the platform truck to the other.

It has also been suggested in the prior art to provide selectable swiveling casters on a platform truck which allow the front casters to swivel or lock in a unidirectional position. For example, some platform trucks provide a spring loaded pin mounted on each caster wheel that engages a notch thereon to prevent that front caster wheel from swiveling when it is desired to lock it in place. Unfortunately, to release the front casters the user has to physically pull a ring at each front caster wheel, requiring the user to step away from the handle, thereby releasing control of the load. Resetting the caster to a locked position is even more cumbersome for the user, requiring the user to orient the caster so that the pin can be re-engaged to the notch. Therefore, what is lacking in the art is a platform truck that includes a user-friendly means of locking and unlocking the caster wheels of the platform truck from the operating position of the platform truck.

Thus, the need exists for a platform truck having an actuator positioned conveniently at the handle end of the truck which allows the front casters to be switched between a fixed position and a swivel position to more easily negotiate tight turns and doorways. The platform truck should also include a more convenient construction for switching the handle from one end of the platform truck to the other, which eliminates the need to remove the handle from the platform truck. The handle should also be stowable in the platform truck itself for ease in loading and unloading the platform truck.

SUMMARY OF THE INVENTION

In general, the present invention provides a platform truck. More specifically, the present invention provides a platform truck comprised of a base member, a handle, a pair of swivel caster wheels depending from the bottom surface back end of the base member, a pair of swivel-lock caster wheels depending from the bottom surface front end of the base member, and a user-activated actuator assembly carried on the bottom surface of the base allowing the front swivel-lock casters to be switched between a unidirectional position and swivelable position to more easily negotiate tight turns and doorways is disclosed. Also included is a handle that is stowable within the base portion of the platform truck so that the platform truck may include one or two handles, whereby a handle may be included on one or both ends of the platform truck. The base includes a front end and a back end, each having pockets formed therein, a top surface for receiving items thereon, a bottom surface, and generally vertically oriented opposed sidewalls extending downwardly from the top surface about the periphery of the base member. The handle includes a hand grip portion and opposing arms, with the lower ends of the opposing arms constructed and arranged to be carried within the pockets on the base member. Each of the front end swivel-lock caster wheels include a mounting member attached to the bottom surface of the base member, a fork connected to the mounting member for swiveling movement upon a swivel bearing along a substantially vertical axis, a locking pin for engaging and disengaging the swivel bearing to allow for swiveling or unidirectional movement, and a castor wheel supported by the fork for rotation about a horizontal axis. The actuator assembly is comprised of a first end, central portion attached to the base member forming a pivot point, and a second end. The first end is positioned between the pair of swivel-lock caster wheels and each locking pin is connected thereto. The second end extends horizontally beyond and through the back end sidewall. The back end sidewall includes a retainer thereon, allowing the second end of the actuator arm to move in a plane parallel to the base member. The positioning of the second end of the arm to a swiveling position withdraws the locking pins from the swivel bearing on each pair of swivel-lock caster wheels to allow for swiveling movement of the wheels; and positioning of the second end of the arm to a unidirectional position locks the locking pins onto the swivel bearing on each pair of swivel-lock caster wheels to allow for only unidirectional movement of the wheels.

Accordingly, it is an objective of the present invention to provide a platform truck having an actuator allowing front casters to be switched between a fixed position and a swivel position.

It is another objective of the present invention to provide a platform truck providing a stow position for the handle within the base member.

It is yet another objective of the present invention to provide a platform truck where the base member further includes sockets on the front and/or rear end sidewall(s) such that a handle arm can be removably attached thereto in a generally vertical position for manipulating the platform truck.

It is a further objective of the present invention to provide a platform truck where the base member further includes pockets on the front and/or rear end sidewall(s) such that a handle arm can be removably attached thereto in a generally horizontal position for storage of the handle arm.

It is yet a further objective of the present invention to provide a platform truck having a stow position for a handle which removes it as an obstacle for large loads on the base member, but keeps the handle with the platform truck for when the emptied platform truck needs to be relocated.

It is still a further objective of the present invention to provide a platform truck that includes an actuator arm that is activated by a user's foot to allow engagement or disengagement of the locking pin on each of the front end swivel-lock caster wheels.

Still a further objective of the present invention is to provide a platform truck having a foot actuated means to switch between a unidirectional movement and a swivelable movement of the front end swivel-lock caster wheels so that the user does not have to let go of the handle.

It is yet a further objective of the present invention to provide a platform truck that allows for ease of operation in a straight line and ease of turning in tight corners in an instance.

An even further objective of the present invention is to provide a platform truck that overcomes the prior art, whereby a user would have to manually pull a ring at each front swivel-lock caster wheel, left and right, in order to engage or disengage the loading pin to allow for unidirectional or swivelable movement of the front wheel. The present invention only requires the movement of an actuator arm at the handle end of the platform truck to switch between unidirectional or swivelable movement of the front wheels.

It is still yet another objective of the present invention to provide back end swivel castor wheels with a wheel brake.

Still yet another objective of the present invention is to provide a platform truck that includes a platform portion constructed of plastic having a metal frame underneath for support of the plastic platform.

Still yet a further objective of the present invention is to provide a platform cart wherein the plastic platform includes integrally formed gussets and ribs for strength and rigidity.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
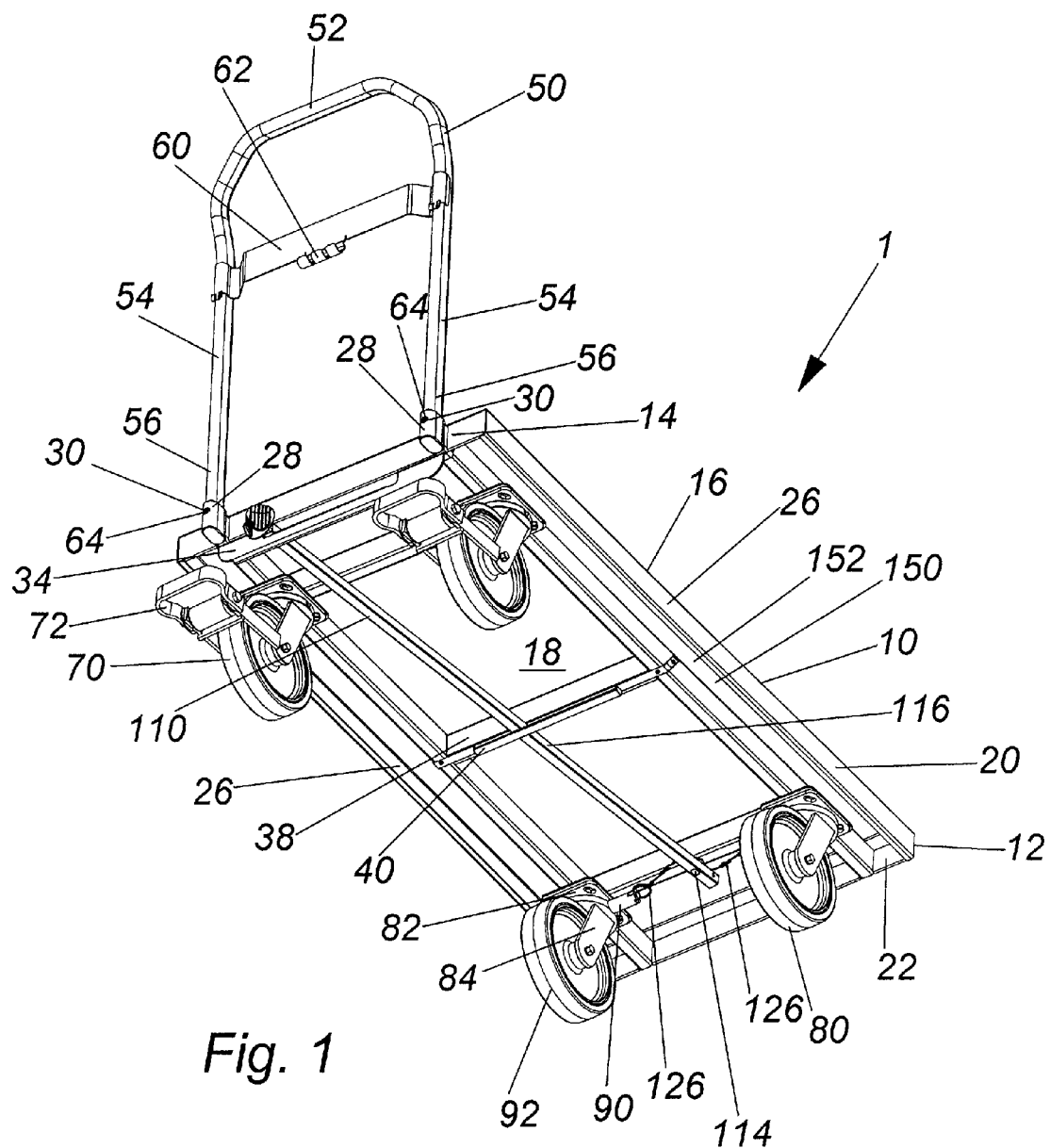
FIG. 1 is a bottom perspective view of the platform truck of the instant invention.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Figure 2:
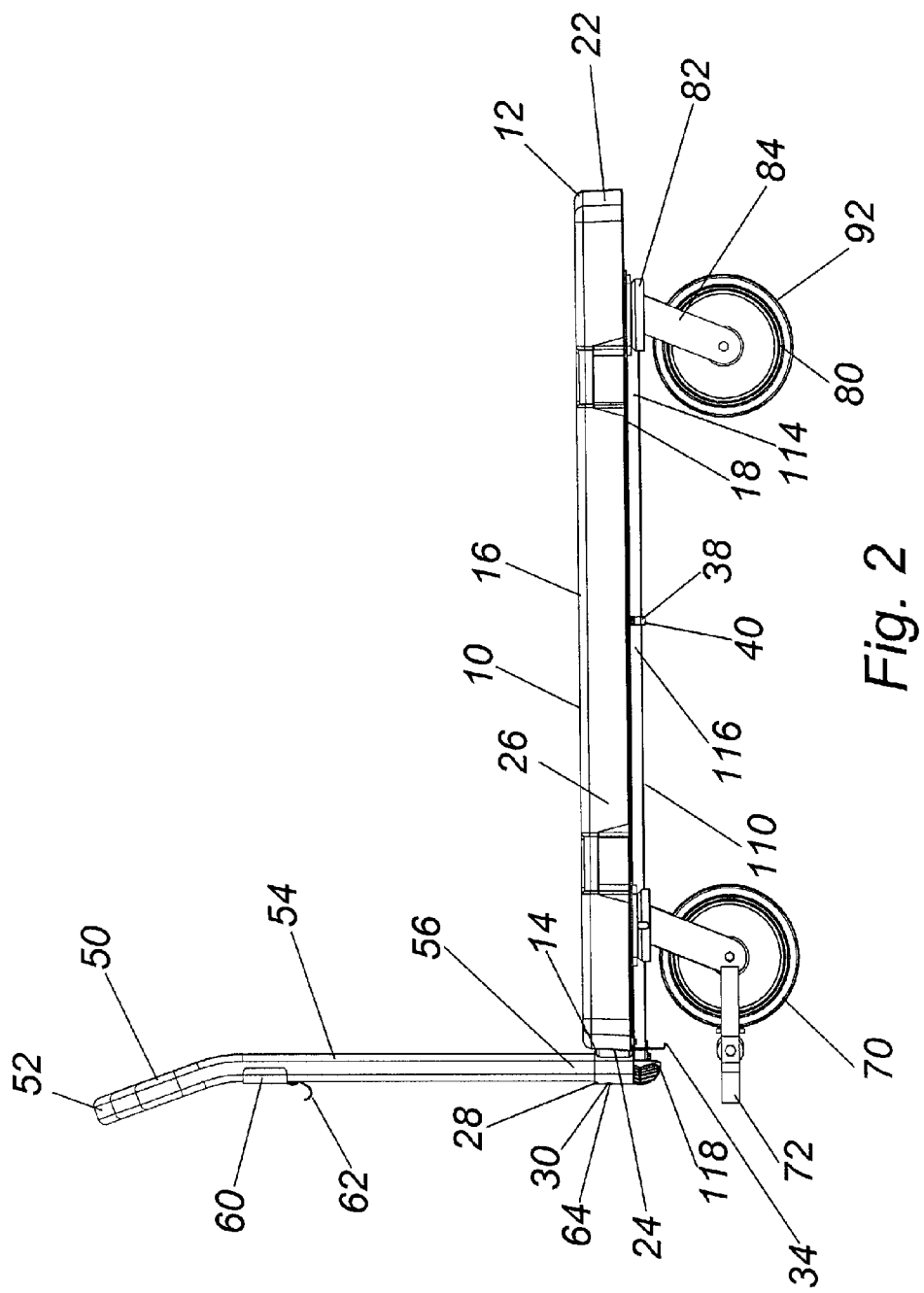
FIG. 2 is a side view of the instant invention.

As shown in FIGS. 1-8, the platform truck 1 is comprised of a base member 10, a handle 50, a back end pair of swivel caster wheels 70, a front end pair of swivel-lock caster wheels 80, and a user activated actuator assembly 110 allowing for unidirectional or swivelable movement of the front end swivel-lock caster wheels 80. As shown in FIGS. 1 and 2, the base member 10 consists of a front end 12, back end 14 having opposing sockets 28 formed therein, a top surface 16 for receiving items thereon, and a bottom surface 18. The top surface 16 includes a peripheral edge 20 and generally vertically opposed sidewalls 26 extending downwardly from peripheral edge 20. The base member 10 can be constructed from steel or plastic having varying sizes depending upon load capacity, which is discussed later. The handle 50 provides a handle bar portion 52 and opposing arms 54 with lower ends 56 constructed and arranged to be carried within the sockets 28 on the base member 10. Each lower end 56 of the arm 54 in the handle 50 includes a spring pin 64. The back end sockets 28 on the base member 10 have an aperture 30 thereon to cooperate with the spring pin 64 on the lower end 56 of the handle arms 54, thereby retaining the handle 50 in place on the base member 10. The handle 50 further includes a cross-piece 60 attached between the arms 54 to provide strength and stability to the handle 50. The cross-piece 60 includes a hanger 62 thereon for hanging and receiving items such as tools, bungee cords, or the like.

Figure 3:
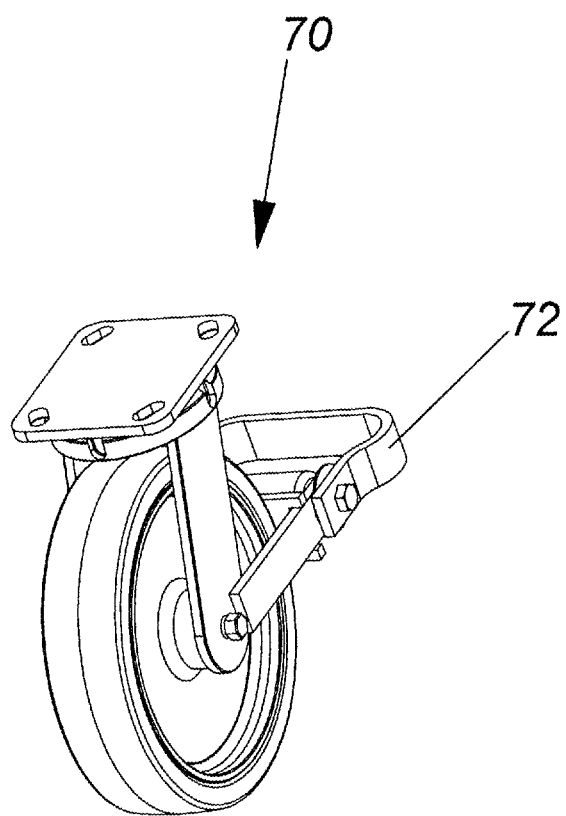
FIG. 3 is a perspective view of the back swivel caster wheel of the instant invention.
Figures 4A, 4B:
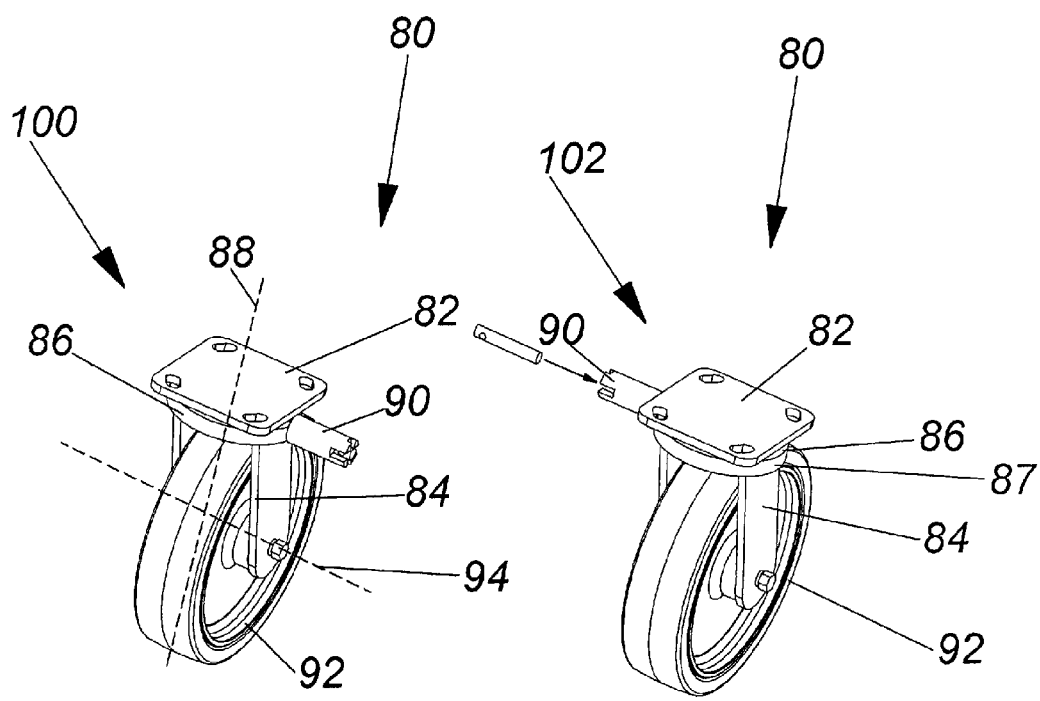
FIGS. 4A and 4B are perspective views of the pair of front swivel-lock caster wheels of the instant invention.
Figure 5:
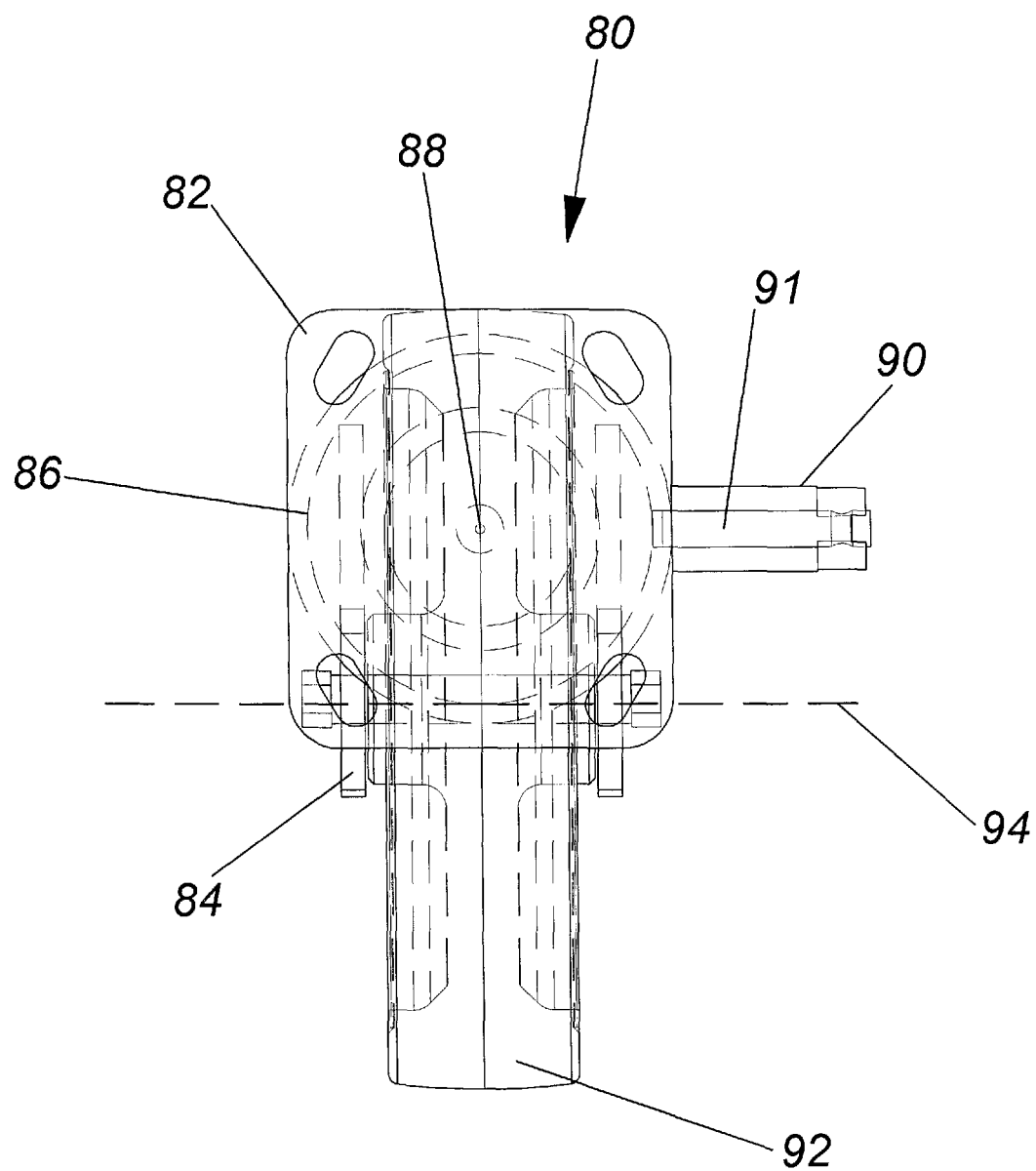
FIG. 5 is a top view of the swivel-lock caster wheel of the instant invention.

As shown in FIG. 2, a side view of one embodiment of the present invention is illustrated. In this embodiment a back end pair of swivel caster wheels 70 depend from the back end 14 bottom surface 18 of the base member 10, and a pair of front end swivel-lock caster wheels 80 depend from the front end 12 bottom surface 18 of the base 10. As shown in FIG. 3, the back end swivel castor wheels 70 include a wheel brake 72. As shown in FIG. 1, the front end pair of swivel-lock caster wheels 80 is comprised of a mounting member 82 attached to the bottom surface 18 of the base member 10. More specifically, as shown in FIGS. 4A, 4B, and 5, a fork 84 is connected to the mounting member 82 for swivelable movement about a swivel bearing 86 in a generally vertical axis 88. A locking cylinder 90 is integrally secured to the mounting member 82 for locking the bearing support 87 to the mounting member with the locking pin 91. The locking cylinder is preferably formed from a tubular section of metal and may contain keyways, guides or the like to orient to the locking pin as it traverses the bore of the tubular member. The locking pin 91 is selectively engagable and disengagable to lock or allow free turning of the swivel bearing 86 for swivelable or unidirectional movement of the caster wheel. The locking pin 91 preferably includes a yoke 93 for attachment to the locking and unlocking linkage. A caster wheel 92 supported by the fork 84 allows for rotation about a horizontal axis of rotation 94, the horizontal axis of rotation 94 being spaced behind the swivel bearing 86 when the castor wheel 92 is in a trailing position. The front end swivel-lock caster wheels 80 are manipulable between a unidirectional movement and swivelable movement using the actuator assembly 110. Additionally, the pair of front swivel-lock caster wheels 80 consist of a left wheel 100 and right wheel 102, the locking pin 91 on the corresponding left or right wheel, 100 and 102, is positioned opposite the peripheral edge 20 on the base member 10, or more specifically towards the center of the base member 10, more aptly shown in FIG. 7.

Figure 6:
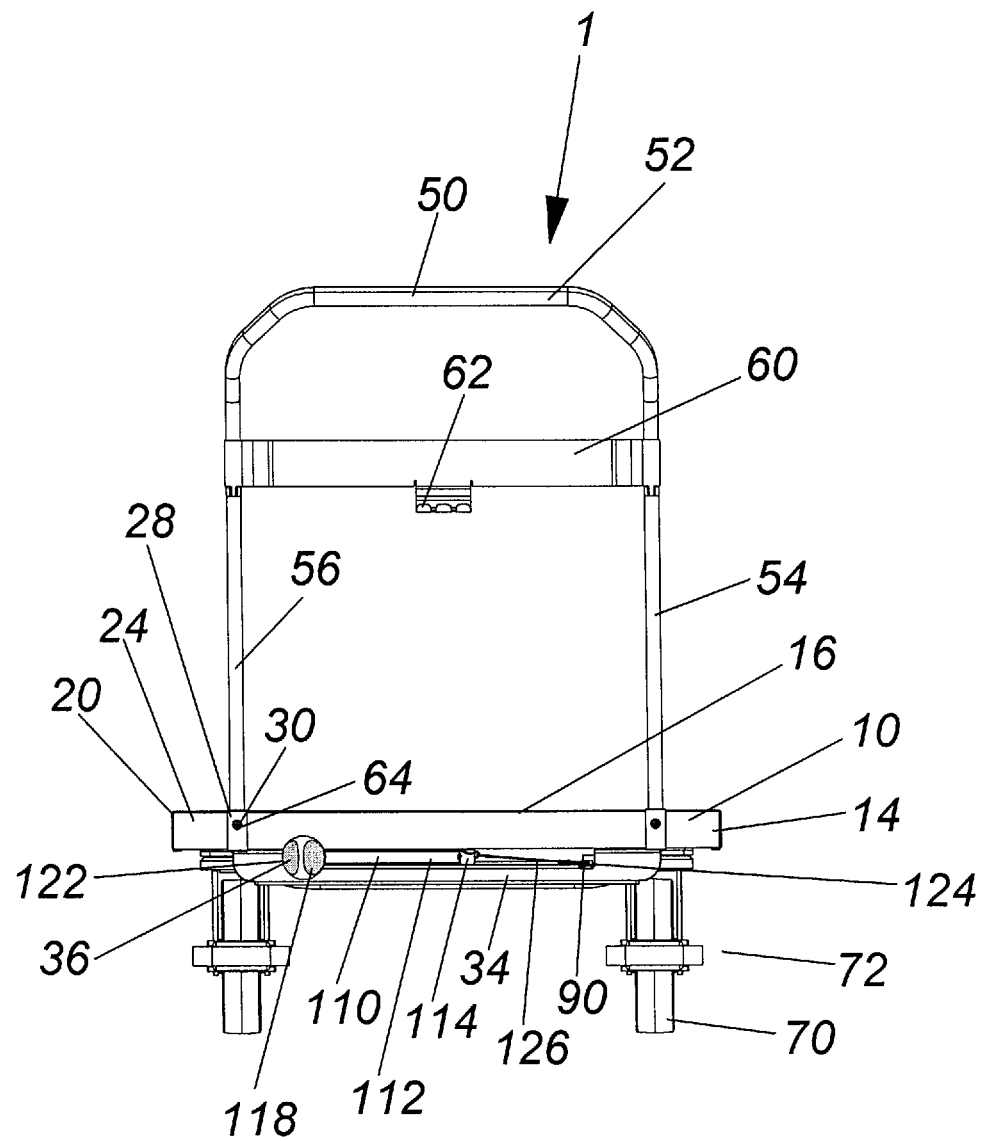
FIG. 6 is a back end view of the instant invention.
Figure 7:
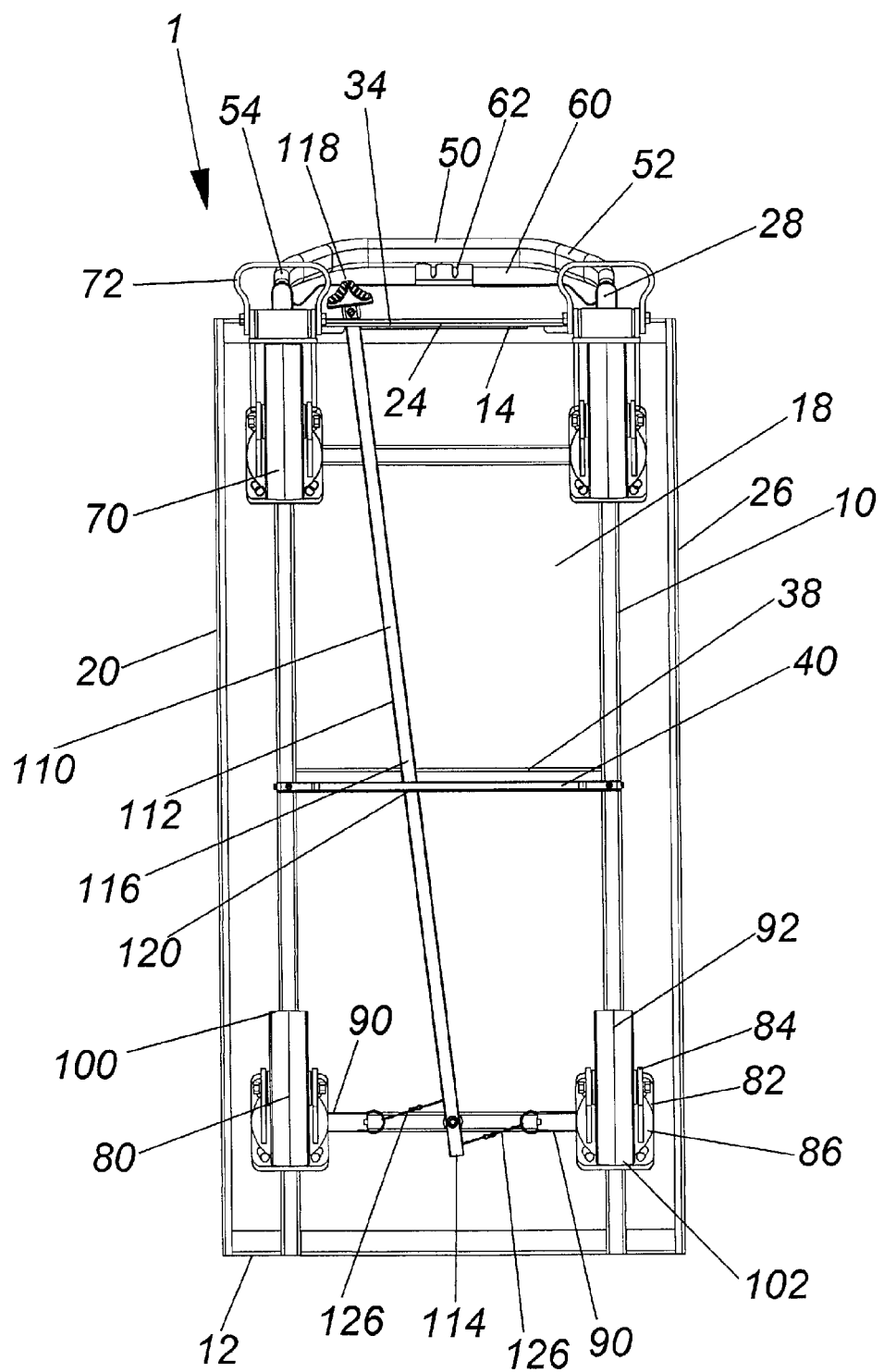
FIG. 7 is a bottom view of the instant invention.

As shown in FIGS. 6 and 7, the user operated actuator assembly 110 is carried on the bottom surface 18 of the base member 10 and connected to the locking pin 91 on each of the front end swivel-lock caster wheels, 100 and 102, permitting for unidirectional or swivelable movement of the front end swivel-lock caster wheels 80. The actuator assembly 110 includes an actuator arm 112 having a first end 114, central portion 116 attached to the bottom surface 18 of the base member 10 forming a pivot point 120, and a second end 118. The first end 114 is positioned between the front end swivel-lock caster wheels 80, and each locking pin 91 on each of the front end swivel-lock caster wheels 80 is connected to the first end 114 of the actuator arm 112 via drag links 126. The drag links 126 are preferably formed as flat elongated metal pieces suitable for fitting within the yoke 93 of the pin 91. Alternatively, cables or the like may be utilized without departing from the scope of the invention. The second end 118 extends horizontally beyond and through the back end sidewall 24 of the base member 10 and is moveable in a horizontal plane parallel to the base member 10 between a swivelable position 124 and unidirectional position 122. The movement of the second end of the arm 118 to a swivel position 124 withdraws or unlocks the locking pin 91 from the swivel bearing 86 on each of the front end swivel-lock caster wheels 80 to allow for swivelable movement 124 of the front end swivel-lock caster wheels 80. The movement of the second end arm 118 to a unidirectional position 122 locks the locking pin 91 onto the swivel bearing 86 on each of the front end swivel-lock caster wheels 80 to allow for unidirectional movement 122 of the front end swivel-lock caster wheels 80. It is contemplated that the actuator arm 112 can be activated by a user's foot to allow engagement or disengagement of the locking pin 91 on each of the front end swivel-lock caster wheels 80. Having a foot actuated means to switch between a unidirectional movement 122 and swivelable movement 124 of the front end swivel-lock caster wheels 80 allows the user to keep hold of the handle 50 while operating the platform truck 1.

Figure 8:
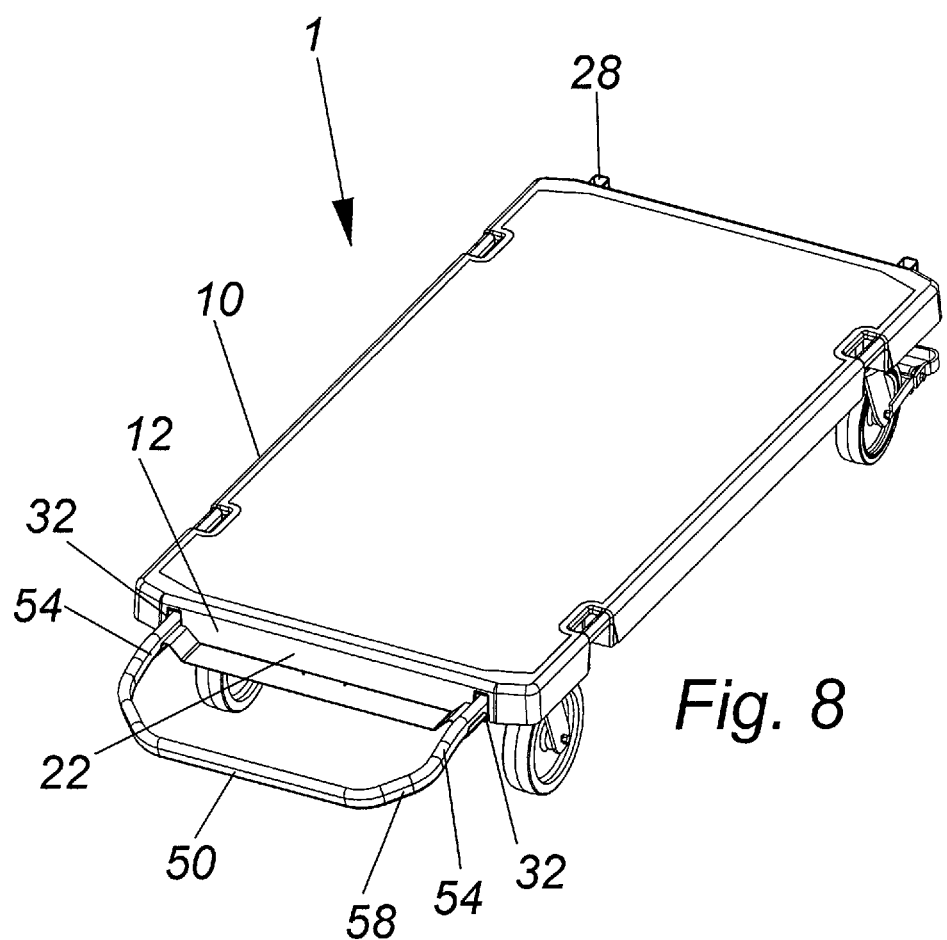
FIG. 8 is a perspective view of an alternative embodiment of the instant invention.

FIG. 8 shows the platform truck 1 having the handle assembly 50 in a stowed position. The base member 10 includes opposed pockets 32 on the front end sidewall 22 such that the handle arms 54 can be removably attached to the pockets 32 in a stowed position. A platform truck 1 having a stow position for a handle 50 removes the handle 50 as an obstacle for large loads that exceed the base member surface area, but keeps the handle 50 with the platform truck 1 for when the emptied platform truck 1 needs to be relocated. In addition, sockets 28 may be provided on the front sidewall of the base member 10 to allow the handle to be switched from one end of the cart to the other.

Referring to FIGS. 1-8, various embodiments of the platform truck 1 are illustrated. The base member 10 of the platform truck 1 is contemplated as being constructed of either steel (FIGS. 1 and 7) or plastic (FIGS. 2, 6, and 8). The steel base member is contemplated as a 30×60 inch heavy duty base member or a 24×48 inch regular duty base member. The heavy duty steel platform truck is rated for a capacity load of approximately 2,000 lbs. The regular duty steel platform truck is rated for a capacity load of approximately 1,000 lbs. FIG. 8 shows a plastic base member construction. The plastic base member is contemplated as a 30×60 inch heavy duty base member, a 24×48 inch regular duty base member, as well as a 24×36 inch regular base member. The heavy duty plastic platform truck is rated for a capacity load of approximately 2,000 lbs. The regular duty 24×48 inch and 24×36 inch plastic platform trucks are rated for a capacity load of approximately 1,000 lbs. Strength for supporting the heavy loads is provided by the downwardly extending peripheral edge 20 along with a sub-frame 150 (FIG. 1). The sub-frame 150 is constructed as a series of rectangular metal members 152 welded together to create a structural member to which the casters are secured. In this manner, the platform truck can utilize a plastic bed while still providing structural integrity for heavy loads. The plastic bed can never rust and does not need to be painted. Typically, loads being moved onto and off of the bed destroy the surface finish on metal flatbed carts allowing rust to form and requiring painting. In the preferred embodiment, the plastic bed is formed by the process of blow molding or injection molding, however, roto-molding may be utilized without departing from the scope of the invention. Additionally, because of the added load capacity between the heavy duty platform truck and the regular duty platform truck, it is contemplated that the heavy duty platform truck is equipped with heavy duty casters with a metal core and urethane low profile tires. The regular duty platform truck is equipped with normal duty casters with a plastic core and urethane, regular profile tires.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A platform truck comprising of:
   a base member having a front end, back end having sockets formed along at least one edge thereof, a top surface for receiving items thereon, and a bottom surface;
   a sub-frame for supporting said base member, said base member extending over and around said sub-frame, said sub-frame including a pair of frame members constructed from a rectangular shaped tubing extending from said front end to said back end, said frame members arranged to be substantially parallel with each other and aligned with said sockets so that arm portions of a handle are storable within said frame members with a handle bar portion of said handle extending between said frame members;
   a handle having a handle bar portion and opposing arms with lower ends constructed and arranged to be carried within said sockets on said base;
   a pair of back end swivel caster wheels secured to said back end of said sub-frame;
   a pair of front end swivel-lock caster wheels secured to said front end of said sub-frame; and
   a user activated actuator assembly carried on said bottom surface of said sub-frame and connected to a locking pin on each said front end swivel-lock caster wheel permitting for unidirectional or swivelable movement of said front end swivel-lock caster wheels;
   whereby said base member is removable from said sub-frame and replaceable to said sub-frame without disassembly of said sub-frame, said sub-frame forming a complete mobile vehicle.

2. The platform truck of claim 1, wherein said base member is constructed from plastic and said sub-frame is constructed from metal.

3. The platform truck of claim 1, wherein said base member is constructed from metal and said sub-frame is constructed from metal.

4. The platform truck of claim 1, wherein each said front end swivel-lock caster wheel includes a mounting member attached to said bottom surface of said sub-frame, a bearing support, said mounting member and said bearing support separated by a bearing for rotational movement therebetween about a substantially vertical axis, a fork connected to said bearing support, a locking cylinder secured to said mounting member, a locking pin slidably mounted within said locking cylinder for engaging and disengaging said bearing support, said locking pin selectively movable between a swivel and a unidirectional position, and a caster wheel supported by said fork for rotation about a horizontal axis of rotation, said horizontal axis of rotation being offset from said substantially vertical axis.

5. The platform truck of claim 4, wherein said locking cylinder includes at least one guide for guiding said locking pin as it traverses a bore within said locking cylinder.

6. The platform truck of claim 1, wherein said actuator assembly includes an arm having a first end, central portion attached to said bottom surface sub-frame forming a pivot point, and a second end, said first end secured to said locking pin on each said front end swivel-lock caster wheel.

7. The platform truck of claim 6, wherein said first end is positioned between said front end swivel-lock caster wheels, said second end extending horizontally through a slotted sub-plate secured across the distal ends of said pair of frame members, and moveable in a horizontal plane parallel to a bottom surface of said sub-frame between a first position which allows said front end swivel-lock caster wheels to pivot and a unidirectional position locking said front end swivel-lock caster wheels in a position that aligns with a longitudinal axis of said platform truck.

8. The platform truck of claim 1, wherein at least one of said back end swivel castor wheels includes a wheel brake.

* * * * *